US009230279B2

United States Patent
Lyman (10) Patent No.: US 9,230,279 B2
(45) Date of Patent: *Jan. 5, 2016

(54) SYSTEMS AND METHODS FOR RECOMMENDING A RETAIL LOCATION (71) Applicant: eBay Inc., San Jose, CA (US)

(72) Inventor: Nate L Lyman, Livermore, CA (US)

(73) Assignee: eBay Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/575,959

(22) Filed: Dec. 18, 2014

(65) Prior Publication Data

US 2015/0106230 A1   Apr. 16, 2015

Related U.S. Application Data (63) Continuation of application No. 13/689,479, filed on Nov. 29, 2012, now Pat. No. 8,944,314.

(51) Int. Cl.
| | | |
|---|---|---|
| *G06F 17/00* | (2006.01) | |
| *G06K 15/00* | (2006.01) | |
| *G06F 19/00* | (2011.01) | |
| *G06Q 30/06* | (2012.01) | |
| *G06Q 30/02* | (2012.01) | |

(52) U.S. Cl.
CPC ........ *G06Q 30/0639* (2013.01); *G06Q 30/0282* (2013.01)

(58) Field of Classification Search
USPC ................ 235/375, 383, 385, 462.45, 472.01
See application file for complete search history.

(56) References Cited

U.S. PATENT DOCUMENTS

| | | |
|---|---|---|
| 6,386,450 B1 | 5/2002 | Ogasawara |
| 6,963,851 B1 * | 11/2005 | Szabo et al. ................. 705/26.8 |
| 8,944,314 B2 | 2/2015 | Lyman |
| 2005/0080683 A1 | 4/2005 | Jordan |
| 2008/0015942 A1 | 1/2008 | Harper et al. |

(Continued)

FOREIGN PATENT DOCUMENTS

WO   WO-2014085667 A1   6/2014

OTHER PUBLICATIONS

"U.S. Appl. No. 13/689,479, Examiner Interview Summary maield Aug. 21, 2014", 3 pgs.

(Continued)

*Primary Examiner* — Tuyen K Vo
(74) *Attorney, Agent, or Firm* — Schwegman Lundberg & Woessner, P.A.

(57) ABSTRACT

A method and a system are disclosed for generating a recommendation of a retail location on a network-based system. For example, a system may obtain a retail location definition associated with a geographic location. The geographic location may represent the retail location. The system then builds a scan event model from product scan messages received from a plurality of scanning devices located within the geographic location. The scan event model may include one or more scan events each being associated with a product definition and the retail location definition. Next, a recommendation query from the search device is received by the system. The recommendation query may include a product identifier and a query location. The system may generate a recommendation of the retail location based on determining that the product identifier and the query location match the one or more scan events of the scan event model.

20 Claims, 7 Drawing Sheets

(56) References Cited

U.S. PATENT DOCUMENTS

| | | | |
|---|---|---|---|
| 2009/0112683 A1 | 4/2009 | Hamilton, II et al. | |
| 2010/0065632 A1 | 3/2010 | Babcock et al. | |
| 2011/0066504 A1* | 3/2011 | Chatow et al. | 705/14.65 |
| 2012/0022930 A1* | 1/2012 | Brouhard | 705/14.22 |
| 2012/0123673 A1 | 5/2012 | Perks et al. | |
| 2012/0123674 A1 | 5/2012 | Perks et al. | |
| 2012/0197751 A1 | 8/2012 | Zatkin et al. | |
| 2013/0218721 A1* | 8/2013 | Borhan et al. | 705/26.41 |
| 2014/0067596 A1* | 3/2014 | McGovern et al. | 705/26.7 |
| 2014/0144979 A1 | 5/2014 | Lyman | |

OTHER PUBLICATIONS

"U.S. Appl. No. 13/689,479, Final Office Action mailed Apr. 10, 2014", 8 pgs.

"U.S. Appl. No. 13/689,479, Non Final Office Action mailed Nov. 26, 2013", 9 pgs.

"U.S. Appl. No. 13/689,479, Notice of Allowance mailed Sep. 22, 2014", 8 pgs.

"U.S. Appl. No. 13/689,479, Response filed Mar. 14, 2014 to Non Final Office Action mailed Nov. 26, 2014", 11 pgs.

"U.S. Appl. No. 13/689,479, Response filed Sep. 10, 2014 to Final Office Action mailed Apr. 10, 2014", 12 pgs.

"International Application Serial No. PCT/US2013/072350, International Preliminary Report on Patentability mailed Jun. 11, 2015", 7 pgs.

"International Application Serial No. PCT/US2013/072350, International Search Report mailed Dec. 17, 2013", 5 pgs.

"International Application Serial No. PCT/US2013/072350, Written Opinion mailed Dec. 17, 2013", 5 pgs.

\* cited by examiner

SYSTEMS AND METHODS FOR RECOMMENDING A RETAIL LOCATION

RELATED APPLICATION

This application is a continuation of U.S. patent application Ser. No. 13/689,479, filed Nov. 29, 2012, the benefit of priority of which is claimed hereby, and which is incorporated herein by reference in its entirety.

TECHNICAL FIELD

This application relates generally to data processing and, in some examples, to systems and methods for generating a recommendation of a retail location.

BACKGROUND

The explosion of information available over network-based systems such as the Internet can overwhelm a person attempting to locate a desired piece of information or product. For example, the categories of products available through a typical network-based commerce system have grown exponentially over the last decade. This dramatic growth has left users with the problem of sorting and browsing through enormous amounts of data to find information or products relevant to their needs. Search engines and recommendation systems have both been developed to assist in locating both information and products within network-based systems.

Traditional recommendation systems have been implemented to attempt to assist users in locating relevant information or products. A successful recommendation system on a network-based commerce system not only saves users time in locating relevant products but also brings extra profits to the commerce system's operators. Most traditional recommendation systems utilize some form of searching technique. For example, traditional recommendation systems may access or otherwise obtain inventory data provided by merchants. The inventory data may indicate that a particular merchant (e.g., such as Best Buy®) may offer a given product for sale. Accordingly, such traditional recommendation systems rely on merchants to provide updates on what products are offered for sale. Often times, the inventory data provided by a merchant merely indicates that a merchant in general offers, or at some point had offered, a given product for sale.

BRIEF DESCRIPTION OF THE DRAWINGS

Some embodiments are illustrated by way of example and not limitation in the figures of the accompanying drawings in which.

DETAILED DESCRIPTION

Example systems and methods for generating a recommendation of a retail location that may offer a given product for sale are shown. The systems and methods for generating the recommendation of the retail location may, in some example embodiments, be based at least in part on historical product scan messages sent to a network-based system by one or more scanning devices. As described in greater detail below, a product scan message may include an electronic message sent by a scanning device (e.g., a mobile phone associated with a consumer interested in a given product) that requests information (e.g., product description, product pricing, product reviews, and the like) pertaining to a corresponding product. In the following description, for purposes of explanation, numerous specific details are set forth in order to provide a thorough understanding of example embodiments. It will be evident, however, to one skilled in the art that the present embodiments described herein may be practiced without these specific details. It will also be evident that the use of recommending a retail location is not limited to the examples provided and may include other scenarios not specifically discussed.

In example embodiments described herein, a system may generate a recommendation of a retail location. For example, a system may obtain a retail location definition associated with a geographic location. The geographic location may represent the retail location. The system then builds a scan event model from product scan messages received from a plurality of scanning devices located within the geographic location. The scan event model may include one or more scan events each being associated with a product definition and the retail location definition. Next, a recommendation query from the search device is received by the system. The recommendation query may include a product identifier and a query location. The system may generate a recommendation of the retail location based on determining that the product identifier and the query location match the one or more scan events of the scan event model.

Further, example embodiments may include a method that generates a recommendation of a retail location. For example, a system may obtain a retail location definition associated with a geographic location. The geographic location may represent the retail location. The system then builds a scan event model from product scan messages received from a plurality of scanning devices located within the geographic location. The scan event model may include one or more scan events each being associated with a product definition and the retail location definition. Next, a recommendation query from the search device is received by the system. The recommendation query may include a product identifier and a query location. The system may generate a recommendation of the retail location based on determining that the product identifier and the query location match the one or more scan events of the scan event model.

These and other embodiments are now described in greater detail.

Platform Architecture

Figure 1:
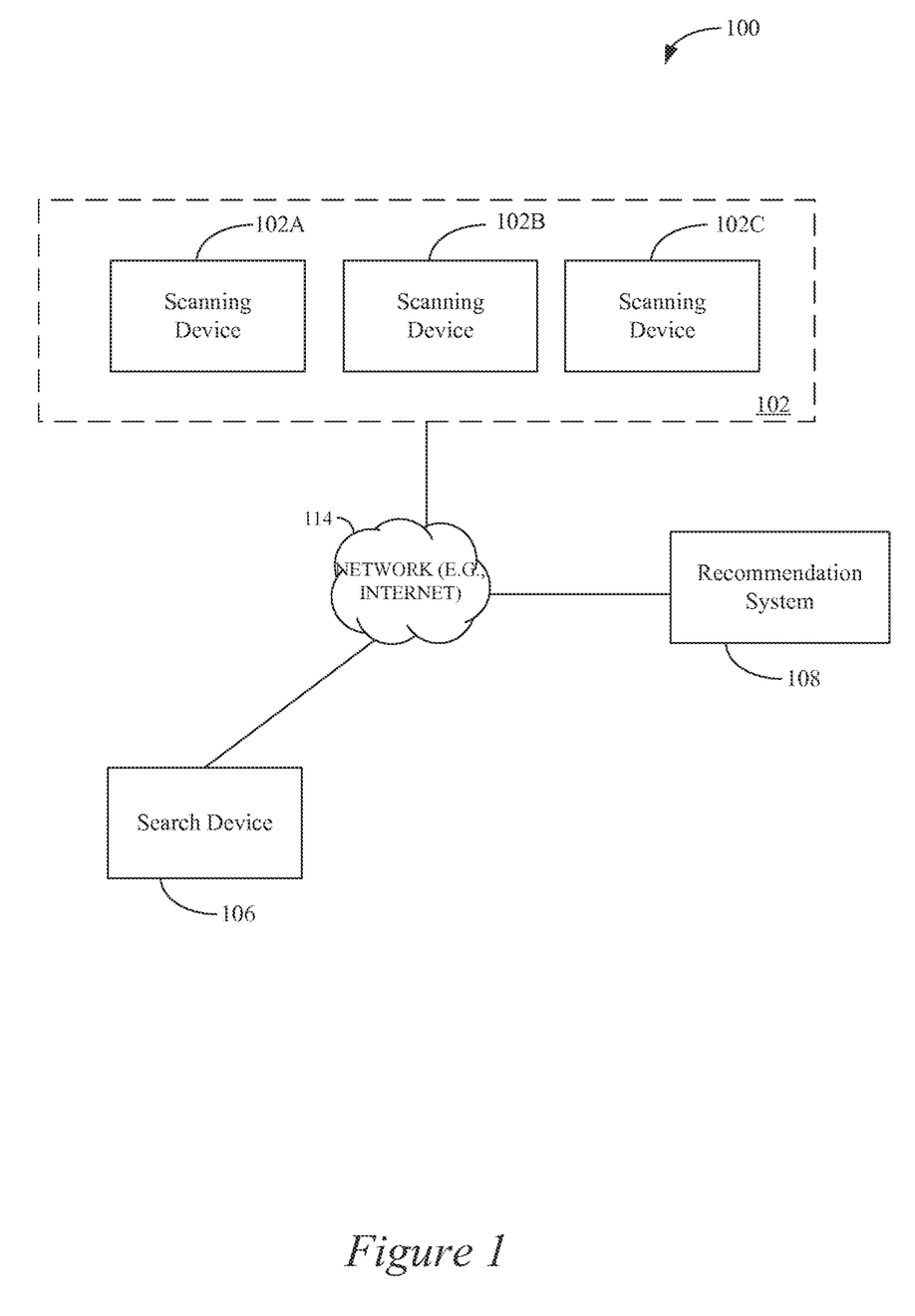
FIG. 1 is a network diagram depicting a recommendation service, according to an example embodiment.

FIG. 1 is a network diagram depicting a recommendation service 100, according to an example embodiment. For example, as shown in FIG. 1, the recommendation service 100 includes a network 114, a recommendation system 108, scanning devices 102A-102C (collectively referred to as scanning device or scanning devices 102), and a search device 106.

The network 114 may be any suitable network used to communicate data between the components shown in FIG. 1. In various embodiments, one or more portions of the network 114 may include an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, or any other type of network, or a combination of two or more such networks.

The scanning devices 102 may be portable computing devices (e.g., mobile phones, laptops, tablets, cameras, or the like) that are configured to send product scan messages to the recommendation system 108, as may be communicated through the network 114. In an example embodiment, the term "product scan message" may refer to an electronic message that specifies that a scanning device has scanned a product code. A product code may be data that uniquely identifies a product in commerce, such as a universal product code (UPC), radio-frequency identification (RFID) tags, quick response (QR) codes, or any other suitable data representation.

The scanning devices 102 may send product scan messages to the recommendation system 108 to request product information regarding the scanned product. For example, the recommendation system 108 may return a product image, product name, product pricing, product reviews, and the like in response to receiving a product scan message.

In some embodiments, the product scan message may include data representing a product code that uniquely identifies the product that was scanned by the scanning device, and a scan location specifying where the scanning took place. In some embodiments, the scan location may include location coordinates (e.g., latitude and longitude coordinates), a virtual parameter, a radius around a location coordinate, or any combination thereof. In some example embodiments, the scan location may include an identifier assigned to a particular retail store, or chain or retail stores.

The search device 106 may be a portable computing device (e.g., a mobile phone, laptop, tablet, camera, or the like) that is configured to send a recommendation query to the recommendation system 108 and, in turn, receive a recommendation of a retail location from the recommendation system 108. A recommendation query may be an electronic message that includes one or more search criteria and a query location. The recommendation returned by the recommendation system 108 may include one or more retail location definitions that represent physical retail stores that might carry a product matching the search criteria in the product search request.

The recommendation system 108 may be a network addressable computer system that builds scan event models by tracking the product scan messages received from the scanning devices 102. As described above, in some embodiments, responsive to receiving a product scan message from the scanning device 102, the recommendation system 108 may return product information relating to the product identifier sent in the product scan message.

In addition to tracking product scan messages, the recommendation system 108 may be configured to provide a recommendation of retail locations that may offer for a product for sale. As is explained in greater detail below, with reference to FIGS. 3-6, the recommendation of retail locations may be generated by the recommendation system 108 using, at least in part, a scan event model built from historical product scan messages sent by the scanning devices 102.

Recommendation Modules

Figure 2:
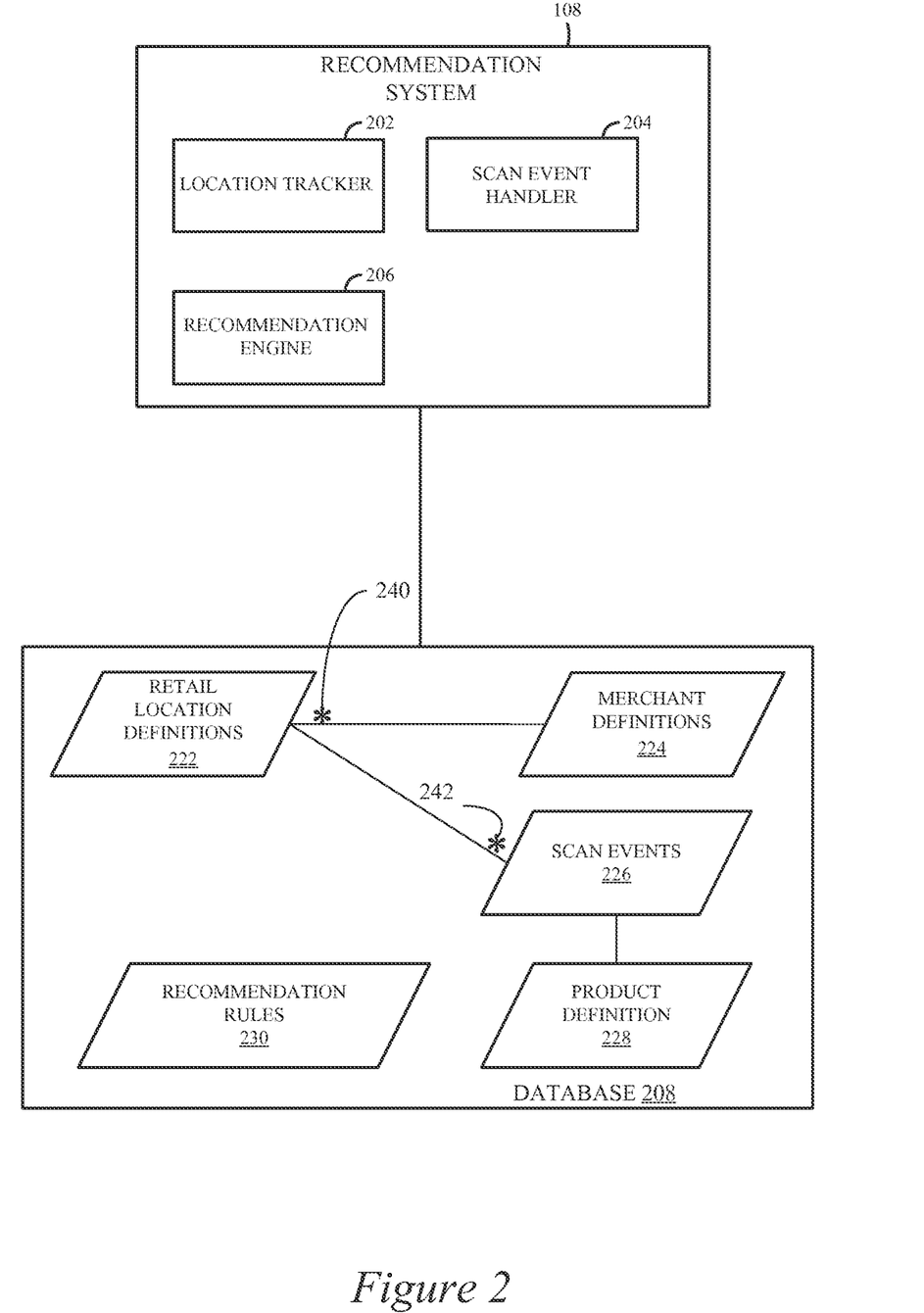
FIG. 2 is a block diagram illustrating example computer-implemented modules that may be utilized by the recommendation system shown in FIG. 1, according to an example embodiment.

FIG. 2 is a block diagram illustrating example computer-implemented modules that may be utilized by the recommendation system 108 shown in FIG. 1 for generating recommendations of retail locations that may offer a given product for sale, according to an example embodiment. As FIG. 2 shows, the recommendation system 108 may, in an example embodiment, include a location tracker 202, a scan event handler 204, a recommendation engine 206, and a database 208.

The location tracker 202 may be a computer-implemented module configured to obtain retail location definitions. As described above, a retail location definition may characterize a real-world geographic location associated with a retail store operated by a merchant. In some embodiments, the retail location definition may characterize the real-world geographic location with one or more geographic coordinates (e.g., longitude and latitude coordinates), a street address, or any other suitable data that may be used to identify a geographic area. For example, one example embodiment may utilize a geographic coordinate and a radius to define a boundary within a geographic space representing a retail store. As another example, an example embodiment may utilize a set of geographic coordinates to define a boundary within a geographic space representing a retail store. Still further, an example embodiment may utilize a street address, and possibly a radius, to define a boundary within a geographic space representing a retail store.

The scan event handler 204 may be a computer-implemented module configured to associate product scan messages with retail locations and products. For example, upon receiving a product scan message from the scanning devices 102, the scan event hander 204 may store a corresponding scan event in the database 208, shown as the scan event 226, and link the scan event 226 to the location definition 222 based on determining that the scan event 226 occurred within a geographic area specified by the location definition 222. In this way, the scan event handler 204 may build a scan event model that characterizes the products sold at a retail store location.

The recommendation engine 206 may be a computer-implemented module configured to generate a recommendation of a retail location based at least in part on a scan event model. Generating a recommendation of the retail location is described in greater detail below.

The database 208 may be a data repository configured to retail location definitions 222, merchant definitions 224, scan events 226, product definitions 228, and recommendation rules 230. The retail location definitions 222 may include one or more retail location definitions. The term "retail location definition," as used herein, may refer to a data structure that includes one or more properties that characterize a geographic location associated with a retail store that offers products or services for sale. Such properties may include any suitable data that specifies a boundary or area within a real-world area. Further, such properties may include any suitable data that associates a retail location with one of the merchant definitions 224.

The merchant definitions 224 may include one or more merchant definitions. As used herein, a "merchant definition"

may be a data structure that includes one or more properties that characterizes an aspect of a corresponding merchant. Such properties may include a merchant name (e.g., Best-Buy®), categories of products sold by the merchant, an industry associated with the merchant, a phone number, a website, and the like. As shown in FIG. 2, the merchant definition 224 may be associated with many retail location definitions 222, as illustrated by the multiplicity symbol 240.

The scan events 226 may store data from or derived from one or more product scan messages previously received by the scan handler 204. As shown in FIG. 2, a location definition may be associated with many scan events, as illustrated by the multiplicity symbol 242.

The product definition 228 may be a data structure that includes one or more properties that characterize aspects of a product. For example, a product definition 228 may include properties that specify a product name, a product code (e.g., a UPC code), an image, consumer reviews, and merchants offering the product for sale.

The scan events 226 associated with location definitions 222 and product definitions 228 form a scan event model. The scan event model may characterize the products offered for sale by a particular merchant.

The recommendation rules 230 may be data or logic usable to make recommendations of retail locations based on the scan event model. In general, the recommendation rules 230 may define criteria that the scan event model must match before generating a recommendation of a retail location.

Further details concerning the methods of operation of the location tracker 202, the scan event handler 204, and the recommendation engine 206 are discussed below in reference to FIGS. 3-6.

Methods of Recommending Retail Locations

Figure 3:
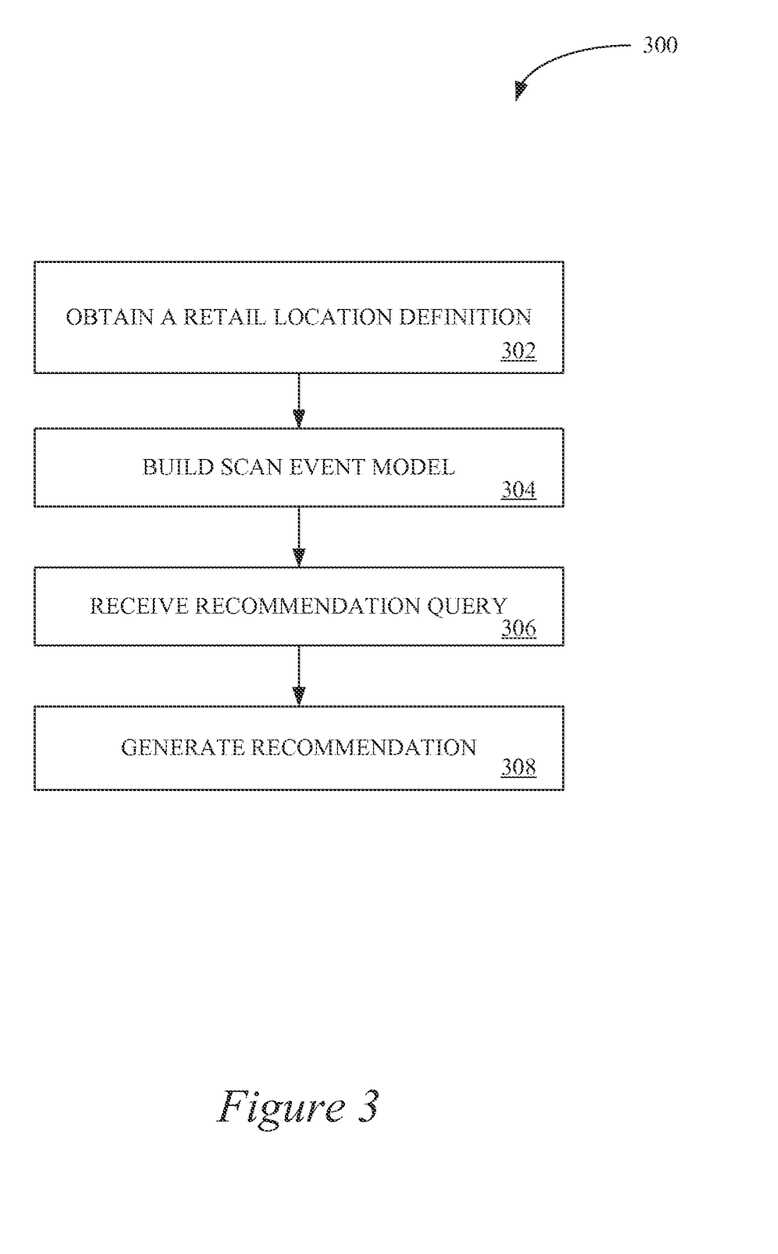
FIG. 3 is a flowchart illustrating a method for generating a recommendation of a retail location based, at least in part, on historical product scan messages associated with the retail location, according to an example embodiment.

FIG. 3 is a flow chart illustrating an example method 300 for generating a recommendation of a retail location based, at least in part, on historical product scan messages associated with the retail location definition, according to an example embodiment. The method 300 may be performed by processing logic that may comprise hardware (e.g., dedicated logic, programmable logic, microcode, etc.), software (such as executes on a general purpose computer system or a dedicated machine), or a combination of both. In an example embodiment, the processing logic resides within the modules illustrated in FIG. 2, such as the location tracker 202, the scan event handler 204, and the recommendation engine 206. Accordingly, the method 300 is discussed with reference to the components, systems, and modules discussed with respect to FIGS. 1 and 2.

As shown in FIG. 3, the method 300 may begin at operation 302 when the location tracker 202 obtains a retail location definition 222 associated with a geographic location representing the retail location. As described above, a retail location definition may be a data structure that includes one or more properties that characterize a geographic location, such as a boundary or area within a real-world area, that represents a physical retail store operated by a merchant (as may be characterized by the merchant definition 224 of FIG. 2). In some embodiments, the retail location definitions 222 may be supplied via a third-party service or by user generated content submitted by users of the scanning devices 102.

At operation 304, the scan event handler 204 may build a scan event model from product scan messages received from the scanning devices 102. As described above, the scan event model may associate one or more scan events with a product definition (e.g., the product definition 228) and a geographic location. In some cases, a scan event model may specify a number of times (referred to as a "scan number") a product was scanned at a given retail location. For example, some embodiments may represent the scan number by storing separate scan events each time a product scan message is received from the scanning device 102. Accordingly, the scan number may be determined by counting the number of scan events that match a given retail location and product. Alternatively, some embodiments may represent the scan number by incrementing a counter each time a product scan message is received that matches a previously stored scan event. A product scan message may match a previously stored scan event when the product scan message and the previously stored scan event both relate to the same product definition and the same retail location definition.

At operation 306, the recommendation engine 206 may receive a recommendation query from the search device 106. In some embodiments, the recommendation query may be an electronic message requesting a recommendation of a retail location that may sell a specified product. In some embodiments, the recommendation query may include a product identifier and a query location. The query location may specify a geographic location to which the recommended retail location is to be nearby. In some embodiments, the query location may be determined based on the location of the search device 106 or an address specified by or otherwise associated with, the user of the search device, as may be entered in an electronic form or determined by a global positioning system (GPS) service, for example.

At operation 308, the recommendation engine 206 may then generate a recommendation of a retail location based on determining that the product identifier and the query location match the one or more scan events of the scan event model. A query location may match a scan event if the query location is within a determinable distance from the geographic location specified by the retail location definition associated with the scan event. A product identifier may match a scan event if the product identifier matches a property specified by the product definition associated with the scan event.

Figure 4:
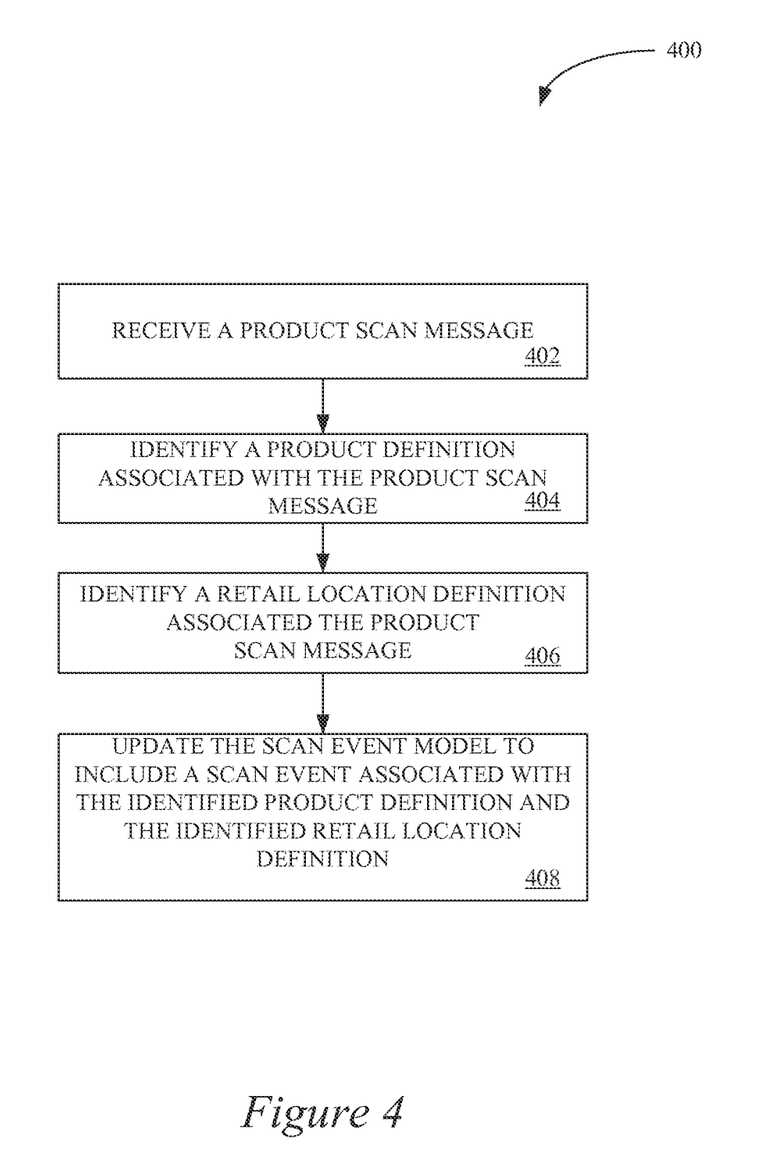
FIG. 4 is a flowchart showing a method for building a scan event model from product scan messages received from a scanning device, according to an example embodiment.

Some of the operations of the method 300 are now described in greater detail. For example, FIG. 4 is a flowchart showing a method 400 of building a scan event model from product scan messages received from scanning devices 102, according to an example embodiment. In some embodiments, the method 400 may be performed as part of operation 304 of FIG. 3. For example, at operation 402, the scan event handler 204 may receive a product scan message. The product scan message may include data representing a product code (e.g., a UPC) and a scan location (e.g., geographic location, such as GPS coordinates). Operation 402 may occur when a consumer is at a physical retail store and scans a UPC code attached to a product that they are interesting in obtaining additional information on.

At operation 404, upon receiving the product scan message, the product scan handler 204 may then identify a product definition associated with the product scan message. For example, the product scan handler 204 may use the data representing the product code to find a matching product definition, such as the product definition 228. In an example embodiment, the data representing the product code may match the product definition 228 based on a determination by the scan event handler 204 that the data representing the product code matches a property from the product definition 228. By way of example and not limitation, the product definition 228 may include a property that stores a UPC assigned to the respective product. Thus, where the data representing a product code is a UPC, the product scan message matches the product definition 228 if the property having the UPC matches the UPC in the product scan message.

At operation 406, the product scan handler 204 may then identify a retail location definition associated with the scan location specified by the product scan message. In some embodiments, identifying a retail location definition may involve the product scan handler 204 matching the scan location specified by product scan message with a geographic location associated with the retail location definition. As discussed above, a retail location definition may be associated with a merchant definition. Thus, in some embodiments, identifying a retail location definition that is associated with the product scan message indirectly identifies a merchant definition that is associated with the product scan message.

At operation 408, the product scan handler 204 may then update the scan events 226 to include a scan event associated with the identified product definition and the identified retail location. A scan event may include data that associates the product definition with the retail location. For example, the scan event may include identifiers, pointers, or any other associating data corresponding to the product definition and the retail location definition. In some embodiments, the scan event may include a time stamp indicative of when the user scanned the product at the retail location.

The operations of the method 400 shown in FIG. 4 may be repeated each time the product scan handler 204 receives a product scan message. In this way, the product scan handler 204 may then build the scan events 226 that include data indicating: what products are being scanned by users, where a given product is being offered for sale, and when a given product is being offered for sale.

Figure 5:
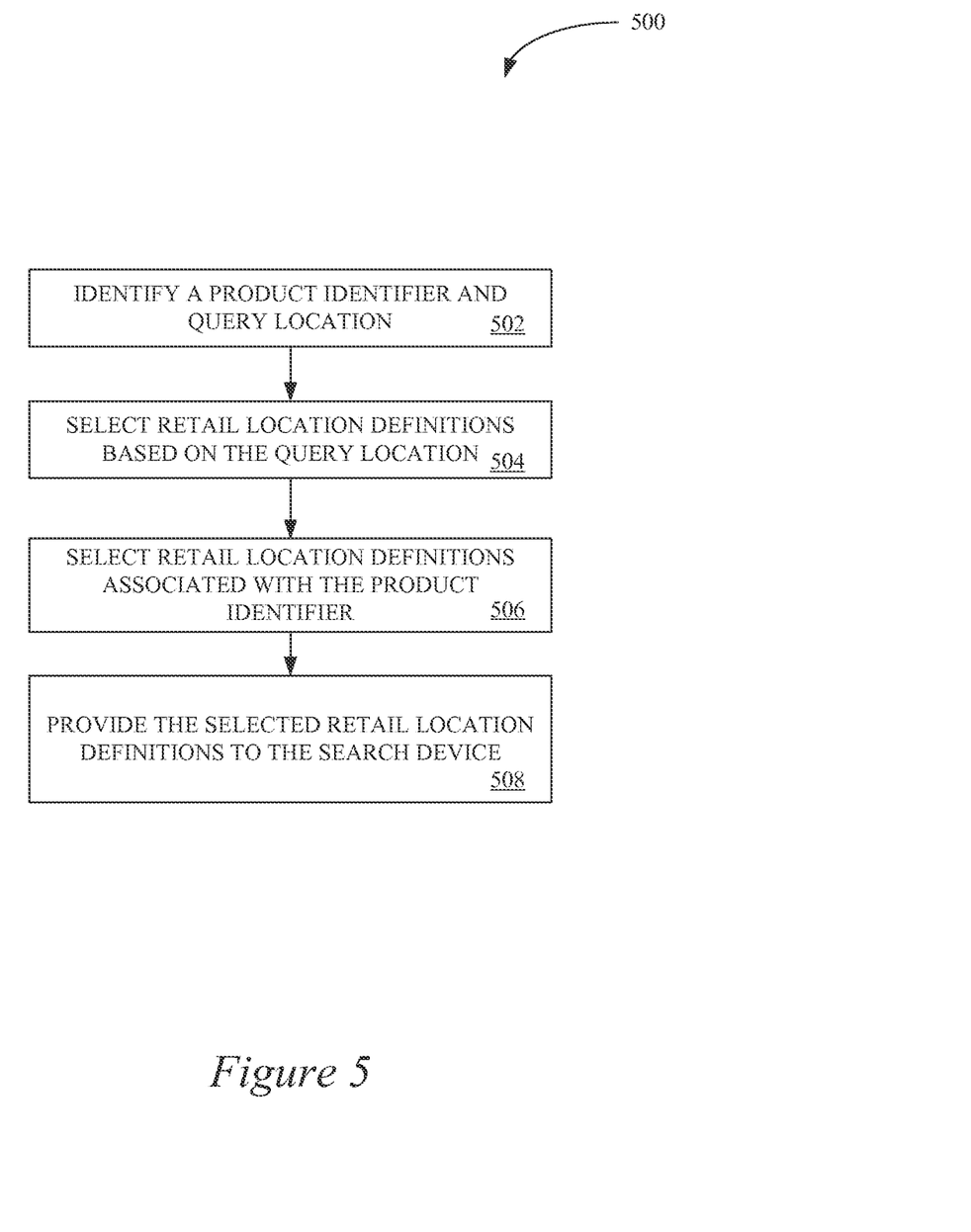
FIG. 5 is a flow chart illustrating a method for generating a recommendation for a retail location based at least in part on historical product scan messages, according to an example embodiment.

The operation of generating a recommendation of a retail location (operation 308 of FIG. 3) is now described in greater detail with reference to FIG. 5. FIG. 5 is a flowchart diagram illustrating a method 500 for generating a recommendation for a retail location based at least in part on historical product scan messages, according to an example embodiment. The method 500 may be performed in response to receiving a recommendation query (for example, operation 306 of FIG. 3), according to an example embodiment.

The method 500 may begin at operation 502 when the recommendation engine 206 identifies a product identifier and query location. In some embodiments, a recommendation query may specify the product identifier and the query location. By way of example and not limitation, the product identifier may be a product name, a product code (e.g., a UPC code, QR code, or the like), a manufacturer name, a product category, or any other suitable data usable to identify a product. The query location may include geographic coordinates (e.g., as may be expressed in longitude and latitude), a city, a state, a zip code, an address, or any combination thereof.

At operation 504, the recommendation engine 206 may use a location rule to select retail location definitions based on the query location specified by the recommendation query. The location rule may be a rule within the recommendation rules 230 that specifies a location-based factor for selecting retail location definitions. For example, a location rule may specify that the retail location is to be within a determinable distance from the query location (e.g., 5 miles, 10 miles, or any other suitable distance) or be within a determinable area associated with the query location, such as a zip code, city, state, or the like.

At operation 506, the recommendation engine 206 may use a product availability rule to further select retail location definitions that may offer a given product for sale based on the identified product identifier. A product availability rule may be a rule within the recommendation rules 230 that is operable to select a retail location definition based on characteristics of the scan events 226 generated by the product scan event handler 202. For example, a product availability rule may specify that a retail location definition may be selected if a scan event associated a retail location definition with a product definition matching a product identifier specified by the recommendation query. Additional availability rules are described in greater detail below.

At operation 508, the recommendation engine 206 provides the selected retail location definitions to the search device 106. In some embodiments, the recommendation engine 206 may provide supplemental pricing information. For example, if the recommendation engine has access to online pricing available for a merchant (e.g., Target®) but doesn't have access to local pricing of the product, and there are valid product scans for the selected retail location, the recommendation engine 206 may return the online pricing data for that merchant for the retail location.

Product Availability Rules

Several product availability rules are now discussed by way of example and not limitation. To begin, a general product availability rule may be operable to select a retail location definition based on the retail location definition being associated with a determinable number of scan events matching the product identifier specified by a recommendation query. For example, where a scan event associates retail location A with a product definition, the general product availability rule may specify that retail location A is to be selected.

Figure 6:
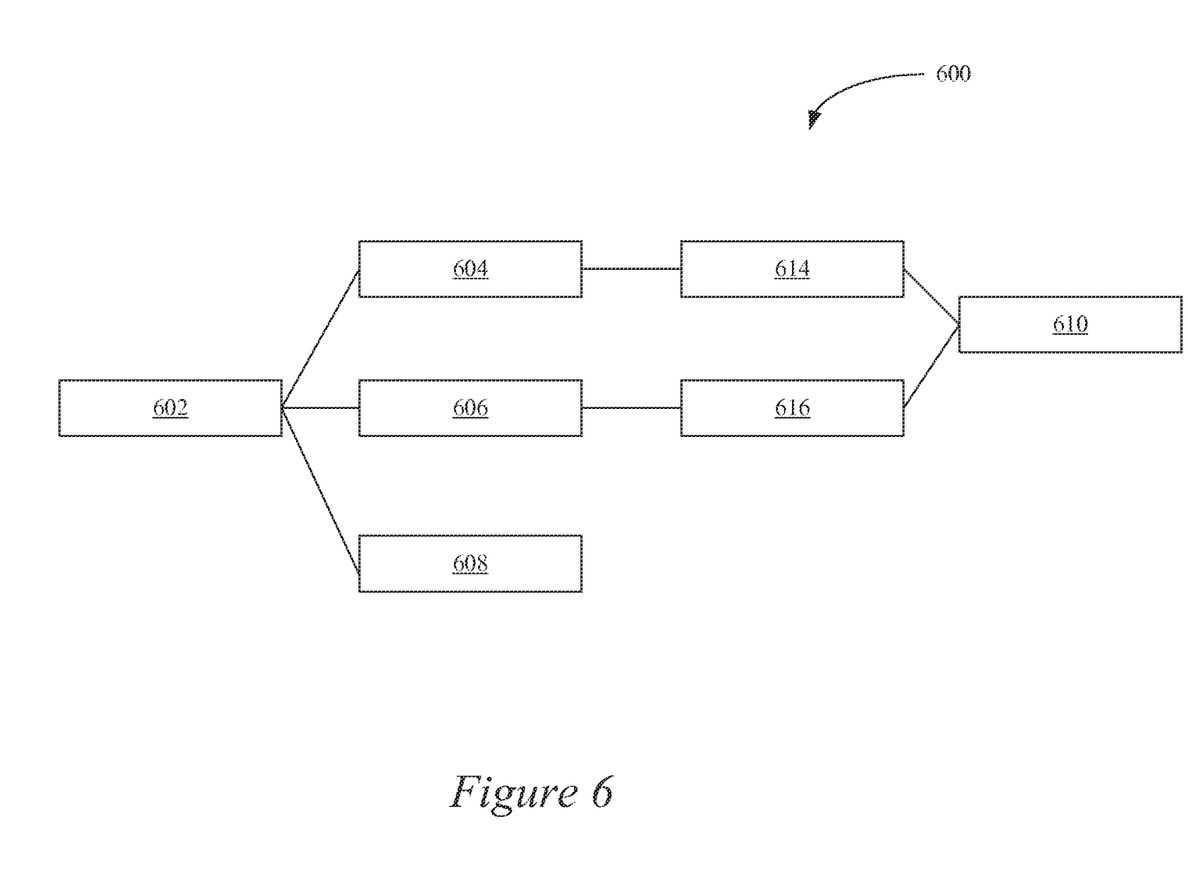
FIG. 6 is a block diagram illustrating a selection of a retail location definition based on scan events associated with other retail locations, according to an example embodiment.

As a derivation of the general product availability rule, a merchant inference product availability rule may be operable to select a retail location definition based on: (1) other retail location definitions being associated with scan events relating to a product; and (2) the retail location definition and the other retail location definitions sharing associations to the same merchant definition. For example, FIG. 6 is a diagram illustrating selecting a retail location definition based on scan events associated with other retail locations, according to an example embodiment. As shown in FIG. 6, a merchant definition 602 may be associated with retail location definitions 604, 606, 608. The merchant definition 602 may be a data structure that includes proprieties that characterize a merchant.

The retail location definitions 604, 606, 608 may each be data structures that include properties that characterize a store location, such as a geographic location. Still further, the retail location definitions 604, 606 may each be associated with product scan events 614, 616, respectively, that are, in turn, associated with a product definition 610. The retail location definitions 604, 606 may be associated with the product scan events 614, 616 when consumers use their scanning devices 102 to generate product scan messages while the consumer is at the geographic location specified by the respective retail location definition.

It is to be appreciated that the retail location definition 608 may lack a product scan event associated with the product definition 610. Thus, according to FIG. 6, a consumer has not yet scanned a product associated with the product definition 610 while at the geographic location associated with retail location definition 608.

Under the general rule, retail location definition 608 may not be selected as retail location definition 608 is not associated with a product scan event associated with the product definition 610. However, the merchant inference product availability rule may select the retail location definition 608 based on the product scan events 614, 616 being associated with retail location definitions (e.g., retail location definitions 604, 606) associated with the same merchant definition (e.g., the merchant definition 602).

In some embodiments, the merchant inference product availability rule may select the retail location definition 618 based on an inference threshold, such as a determinable number of retail location definitions being associated with scan events relating to a given product definition. By way of example and not limitation, if product A is scanned at 120 different Best Buy® stores, the merchant inference product availability rule may infer that all stores belonging to Best Buy® sell product A. In some embodiments, inference threshold may be a determinable percentage (e.g., >50%) of retail location definitions associated with the merchant definition having scan events relating to a product definition.

In some cases, there may be product availability rules that filter retail locations based on the number of scan events associated with a retail location definition. For example, a scan event threshold availability rule may filter out retail locations if the number of product scan events associated with a given product definition fails to meet a determinable product scan event threshold. For example, where the product scan event threshold is 2, if product A is scanned only once at the retail location definition 604, the scan event threshold availability rule may filter or otherwise make that retail location definition 604 unavailable for selection. If the product is scanned again, the scan event threshold availability rule would infer that the retail location definition carries the product.

A category availability rule may determine how to handle scan events based on a function of: (a) the category of the merchant definition; and (b) the category of the product definition. A category, in some embodiments, may be a property of a merchant definition or a product definition that specifies a particular type of product, such as consumer electronics, home goods, clothing, and the like. In some embodiments, categories may be organized in a hierarchy to indicate specializations of categories (e.g., consumer electronics may include televisions). In an example embodiment, a category availability rule may specify that a scan event is valid if the category of the associated merchant definition (e.g., the merchant definition 602) matches the category of the associated product definition (e.g., the product definition 610). Otherwise, the product scan event may be discarded or otherwise filtered out if the category of the merchant definition does not match the category of the product definition.

Modules, Components and Logic

Certain embodiments are described herein as including logic or a number of components, modules, or mechanisms. Modules may constitute either software modules (e.g., code embodied on a machine-readable medium or in a transmission signal) or hardware modules. A hardware module is tangible unit capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired) or temporarily configured (e.g., programmed) to operate in a certain manner and/or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or more processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., Application Program Interfaces (APIs)).

Electronic Apparatus and System

Example embodiments may be implemented in digital electronic circuitry, or in computer hardware, firmware, software, or in combinations of these. Example embodiments may be implemented using a computer program product, e.g., a computer program tangibly embodied in an information carrier, e.g., in a machine-readable medium for execution by, or to control the operation of, data processing apparatus, e.g., a programmable processor, a computer, or multiple computers.

A computer program can be written in any form of programming language, including compiled or interpreted languages, and it can be deployed in any form, including as a stand-alone program or as a module, subroutine, or other unit suitable for use in a computing environment. A computer program can be deployed to be executed on one computer or on multiple computers at one site or distributed across multiple sites and interconnected by a communication network.

In example embodiments, operations may be performed by one or more programmable processors executing a computer program to perform functions by operating on input data and generating output. Method operations can also be performed by, and apparatus of example embodiments may be implemented as, special purpose logic circuitry, e.g., a FPGA or an application-specific integrated circuit (ASIC).

The computing system can include clients and servers. A client and server are generally remote from each other and typically interact through a communication network. The relationship of client and server arises by virtue of computer programs running on the respective computers and having a client-server relationship to each other. In embodiments deploying a programmable computing system, it will be appreciated that both hardware and software architectures require consideration. Specifically, it will be appreciated that the choice of whether to implement certain functionality in permanently configured hardware (e.g., an ASIC), in temporarily configured hardware (e.g., a combination of software and a programmable processor), or a combination of permanently and temporarily configured hardware may be a design choice. Below are set out hardware (e.g., machine) and software architectures that may be deployed, in various example embodiments.

Example Machine Architecture and Machine-Readable Medium

Figure 7:
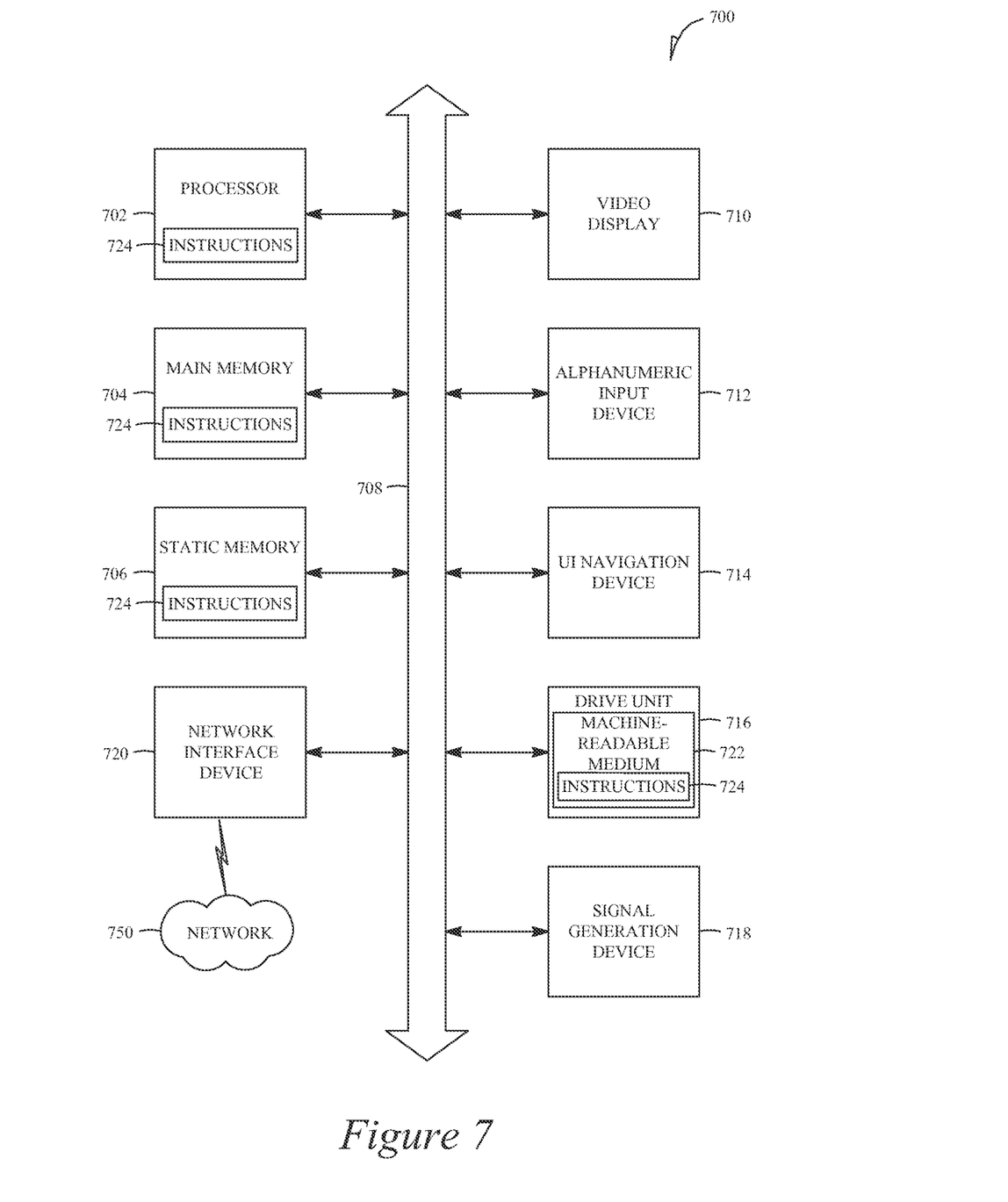
FIG. 7 is a diagrammatic representation of a machine in the example form of a computer system within which a set of instructions for causing the machine to perform any one or more of the methodologies discussed herein, according to an example embodiment.

FIG. 7 is a block diagram of a machine in the example form of a computer system 700 within which instructions for causing the machine to perform any one or more of the methodologies discussed herein may be executed. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a personal digital assistant (PDA), a cellular telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 700 includes a processor 702 (e.g., a central processing unit (CPU), a graphics processing unit (GPU) or both), a main memory 704, and a static memory 706, which communicate with each other via a bus 708. The computer system 700 may further include a video display unit 710 (e.g., a liquid crystal display (LCD) or a cathode ray tube (CRT)). The computer system 700 also includes an alphanumeric input device 712 (e.g., a keyboard), a user interface (UI) navigation device 714 (e.g., a mouse), a disk drive unit 716, a signal generation device 718 (e.g., a speaker), and a network interface device 720.

Machine-Readable Medium

The disk drive unit 716 includes a machine-readable medium 722 on which is stored one or more sets of data structures and instructions (e.g., software) 724 embodying or utilized by any one or more of the methodologies or functions described herein. The instructions 724 may also reside, completely or at least partially, within the main memory 704 and/or within the processor 702 during execution thereof by the computer system 700, with the main memory 704 and the processor 702 also constituting machine-readable media.

While the machine-readable medium 722 is shown in an example embodiment to be a single medium, the term "machine-readable medium" may include a single medium or multiple media (e.g., a centralized or distributed database, and/or associated caches and servers) that store the one or more data structures and instructions 724. The term "machine-readable medium" shall also be taken to include any tangible medium that is capable of storing, encoding or carrying instructions for execution by the machine and that cause the machine to perform any one or more of the methodologies described herein, or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including by way of example semiconductor memory devices, e.g., Erasable Programmable Read-Only Memory (EPROM), Electrically Erasable Programmable Read-Only Memory (EEPROM), and flash memory devices; magnetic disks such as internal hard disks and removable disks; magneto-optical disks; and CD-ROM and DVD-ROM disks.

Transmission Medium

The instructions 724 may further be transmitted or received over a communications network 750 using a transmission medium. The instructions 724 may be transmitted using the network interface device 720 and any one of a number of well-known transfer protocols (e.g., HyperText Transfer Protocol (HTTP)). Examples of communication networks include a LAN, a WAN, the Internet, mobile telephone networks, Plain Old Telephone (POTS) networks, and wireless data networks (e.g., WiFi and WiMax networks). The term "transmission medium" shall be taken to include any intangible medium that is capable of storing, encoding or carrying instructions for execution by the machine, and includes digital or analog communications signals or other intangible media to facilitate communication of such software.

Thus, a method and system for making contextual recommendations to users on a network-based marketplace have been described. Although the example embodiments have been described with reference to specific example implementations, it will be evident that various modifications and changes may be made to these implementations without departing from the broader spirit and scope of this disclosure. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

All publications, patents, and patent documents referred to in this document are incorporated by reference herein in their entirety, as though individually incorporated by reference. In the event of inconsistent usages between this document and those documents so incorporated by reference, the usage in the incorporated reference(s) should be considered supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

What is claimed is:

1. A system comprising:
    a scan event handler, implemented by one or more processors, configured to build a scan event model from historical product scan messages previously received from a plurality of scanning devices associated with a plurality of users, each of the historical product scan messages being associated with a product and a scan location; and
    a recommendation engine, implemented by the one or more processors, configured to:
        receive a query from a device associated with a specific user, the query including product identifier and a query location; and
        generate a recommendation of a location related to the product identifier, based on determining that the product identifier and the query location included in the query match one or more scan events of the scan event model that are associated with the historical product scan messages.

2. The system of claim 1, wherein the historical product scan messages are received responsive to each of the scanning devices scanning a universal product code (UPC) attached to a product.

3. The system of claim 1, wherein the scan location associated with at least one of the historical product scan messages corresponds to geo-location information from one of the scanning devices.

4. The system of claim 1, wherein the query location corresponds to geo-location information from the device associated with the specific user.

5. The system of claim 1, wherein, in generating the recommendation of the location, the recommendation engine is further configured to determine that the product identifier in the query matches a product associated with a specific one of the historical product scan messages.

6. The system of claim 5, wherein, in generating the recommendation of the location, the recommendation engine is further configured to determine the query location included in the query is proximate to a scan location associated with the specific one of the historical product scan messages.

7. The system of claim 6, wherein the recommended location corresponds to the scan location associated with the specific one of the historical product scan messages.

8. A method comprising:
    building a scan event model from historical product scan messages previously received from a plurality of scanning devices associated with a plurality of users, each of the historical product scan messages being associated with a product and a scan location;
    receiving a query from a device associated with a specific user, the query including a product identifier and a query location; and
    generating, using one or more processors, a recommendation of a location related to the product identifier, based on determining that the product identifier and the query location included in the query match one or more scan events of the scan event model that are associated with the historical product scan messages.

9. The method of claim 8, wherein the historical product scan messages are received responsive to each of the scanning devices scanning a universal product code (UPC) attached to a product.

10. The method of claim 8, wherein the scan location associated with at least one of the historical product scan messages corresponds to geo-location information from one of the scanning devices.

11. The method of claim 8, wherein the query location corresponds to geo-location information from the device associated with the specific user.

12. The method of claim 8, wherein the generating further comprises determining that the product identifier in the query matches a product associated with a specific one of the historical product scan messages.

13. The method of claim 12, wherein the generating further comprises determining that the recommendation engine is further configured to determine the query location included in the query is proximate to a scan location associated with the specific one of the historical product scan messages.

14. The method of claim 13, wherein the recommended location corresponds to the scan location associated with the specific one of the historical product scan messages.

15. A non-transitory machine-readable storage medium comprising instructions that, when executed by one or more processors of a machine, cause the machine to perform operations comprising:
- building a scan event model from historical product scan messages previously received from a plurality of scanning devices associated with a plurality of users, each of the historical product scan messages being associated with a product and a scan location;
- receiving a query from a device associated with a specific user, the query including a product identifier and a query location; and
- generating a recommendation of a location related to the product identifier, based on determining that the product identifier and the query location included in the query match one or more scan events of the scan event model that are associated with the historical product scan messages.

16. The storage medium of claim 15, wherein the historical product scan messages are received responsive to each of the scanning devices scanning a universal product code (UPC) attached to a product.

17. The storage medium of claim 15, wherein the scan location associated with at least one of the historical product scan messages corresponds to geo-location information from one of the scanning devices.

18. The storage medium of claim 15, wherein the generating further comprises determining that the product identifier in the query matches a product associated with a specific one of the historical product scan messages.

19. The storage medium of claim 18, wherein the generating further comprises determining that the recommendation engine is further configured to determine the query location included in the query is proximate to a scan location associated with the specific one of the historical product scan messages.

20. The storage medium of claim 19, wherein the recommended location corresponds to the scan location associated with the specific one of the historical product scan messages.

* * * * *

UNITED STATES PATENT AND TRADEMARK OFFICE
CERTIFICATE OF CORRECTION

| | | |
|---|---|---|
| PATENT NO. | : 9,230,279 B2 | Page 1 of 1 |
| APPLICATION NO. | : 14/575959 | |
| DATED | : January 5, 2016 | |
| INVENTOR(S) | : Nate L. Lyman | |

It is certified that error appears in the above-identified patent and that said Letters Patent is hereby corrected as shown below:

Title Page

Item (56), in column 2, under "Other Publications", line 1, delete "maield" and insert --mailed--, therefor

Claims

In column 14, line 2, in Claim 1, after "including", insert --a--, therefor

Signed and Sealed this
Thirty-first Day of May, 2016

Michelle K. Lee
*Director of the United States Patent and Trademark Office*